INVENTORS
William C. Pritchett
Orland J. Gant, Jr.
Ray L. Calkins
BY
Blucher & Tharp
Attorney

United States Patent Office 3,484,608
Patented Dec. 16, 1969

3,484,608
METHOD FOR CHLORINE LOGGING USING A PLURALITY OF SELECT NARROW WINDOWS AS DETERMINATIVE OF CHLORINE
William C. Pritchett and Orland J. Gant, Jr., Dallas, and Ray L. Calkins, Richardson, Tex., assignors to Atlantic Richfield Company, Philadelphia, Pa., a corporation of Pennsylvania
Filed May 13, 1966, Ser. No. 549,945
Int. Cl. G01t 1/20, 1/16; H01j 39/18
U.S. Cl. 250—71.5      3 Claims

ABSTRACT OF THE DISCLOSURE

A chlorine logging system especially adapted for use in logging carbonate formations. Select narrow windows in the broad range of 5.0 to 6.5 mev. are taken as determinative of chlorine.

---

The present invention relates to new and useful methods for conducting chlorine logging operations and to novel apparatus for performing such methods. More specifically, the invention relates to methods for chlorine logging whereby response to chlorine is improved and concerns an improved chlorine logging tool designed to pass through a borehole and survey subsurface formations.

The technique of chlorine logging is used extensively to log or map existing boreholes to determine new producing formations. One is able to indicate porous zones, i.e., formations which have a high fluid content, and predict whether such zones contain substantial amounts of salt water. A formation which has a high fluid content and a low concentration of salt (chlorine) may be assumed to contain petroleum or related materials.

A chlorine log of a well is obtained by bombarding the formations penetrated by the well with fast neutrons and measuring response in terms of prompt capture gamma rays in a given energy range. Formation fluids, earth materials, etc., moderate the fast neutrons until they reach thermal energy and become subject to capture by atoms of various subsurface elements. As a result of such captures gamma rays are emitted which have energies characteristic of the absorbing elements. Since chlorine is a principal capturer of thermal neutrons because of its large capture cross section, the chlorine content of a formation can be determined from the count rate of returned gamma rays with energies characteristic of chlorine.

In application Ser. No. 480,239, now U.S. Patent 3,368,075 one of the present applicants in conjunction with others proposed that an energy range of 5.00 to 6.50 mev. be utilized for scanning the capture gamma ray energy spectrum for chlorine. This window has proved effective for logging sandstones of the Gulf Coast; however, inconclusive results have generally been obtained for limestones, dolomites, and other rock types in West Texas and New Mexico.

Various reasons can be proposed explaining why the chlorine logging methods and apparatus developed for sandstones are unusable in largely carbonate formations.

Calcium has a higher capture cross section (0.43 barn) for thermal neutrons than does silicon (0.13 barn).

The capture gamma rays from chlorine are difficult to distinguish from the capture gamma rays from calcium.

Porosity is generally quite low in West Texas as compared to the Gulf Coast, e.g., 5–15% compared to 20–35%. (The sensitivity of measurements of fluid salinity decreases with reduced porosity.)

The great variation in rock chemistry in West Texas causes considerable variation in the measured response from formation to formation (even for constant porosity and salinity).

Accordingly, it is an object of the present invention to provide a method and means for conducting chlorine logging operations whereby salinity measurements can be made under varying conditions.

Another object of this invention is to provide a method and apparatus for chlorine logging of carbonate formations whereby chlorine response is improved.

Another object is to provide critical energy ranges for viewing the prompt capture gamma ray spectrum exclusively for chlorine during chlorine logging operations.

Another object is to provide a chlorine logging tool capable of being used to practice the methods of this invention.

Another object is to provide a downhole pulse height analyzer for determining whether detected gamma rays have energies within preselected critical ranges characteristic of chlorine.

Other objects and advantages of the invention will be apparent from the following description and the accompanying drawings, wherein.

The invention contemplates a chlorine logging operation utilizing select narrow window widths, e.g., widths of 0.25 mev. or thereabouts, within the broad range of 5.00–6.50 mev. as indicative of chlorine. More particularly, applicants have established that windows having energy ranges of 5.00–5.25, 5.50–5.75 and/or 6.00–6.25 mev. are critical for determining the chlorine content of carbonate formations.

The general method of the invention may be described as bombarding a subsurface formation with fast neutrons; detecting prompt capture gamma rays emitted in response to the neutrons which are moderated by the formation; analyzing a portion of the energy spectrum of the gamma rays over the interval of 5.00–6.50 mev. to determine the pulse signals for at least one window characteristic of chlorine with a width of 0.25 mev.; transmitting information regarding the pulse signals uphole; and recording the information as indicative of chlorine in the formation.

The basic apparatus comprising the invention may be described as a logging tool having a neutron source; a scintillation crystal spaced apart from the source; a photomultiplier tube optically coupled to the crystal; amplifying means connected to the output of the tube; and a pulse height analyzer having a chlorine discriminator means responsive to a portion of the energy spectrum over the interval of 5.00–6.50 mev. which means includes at least one pair of discriminators connected in parallel to the output of the amplifying means for passing pulse signals within at least one window characteristic of chlorine with a width of 0.25 mev.

Figure 1:
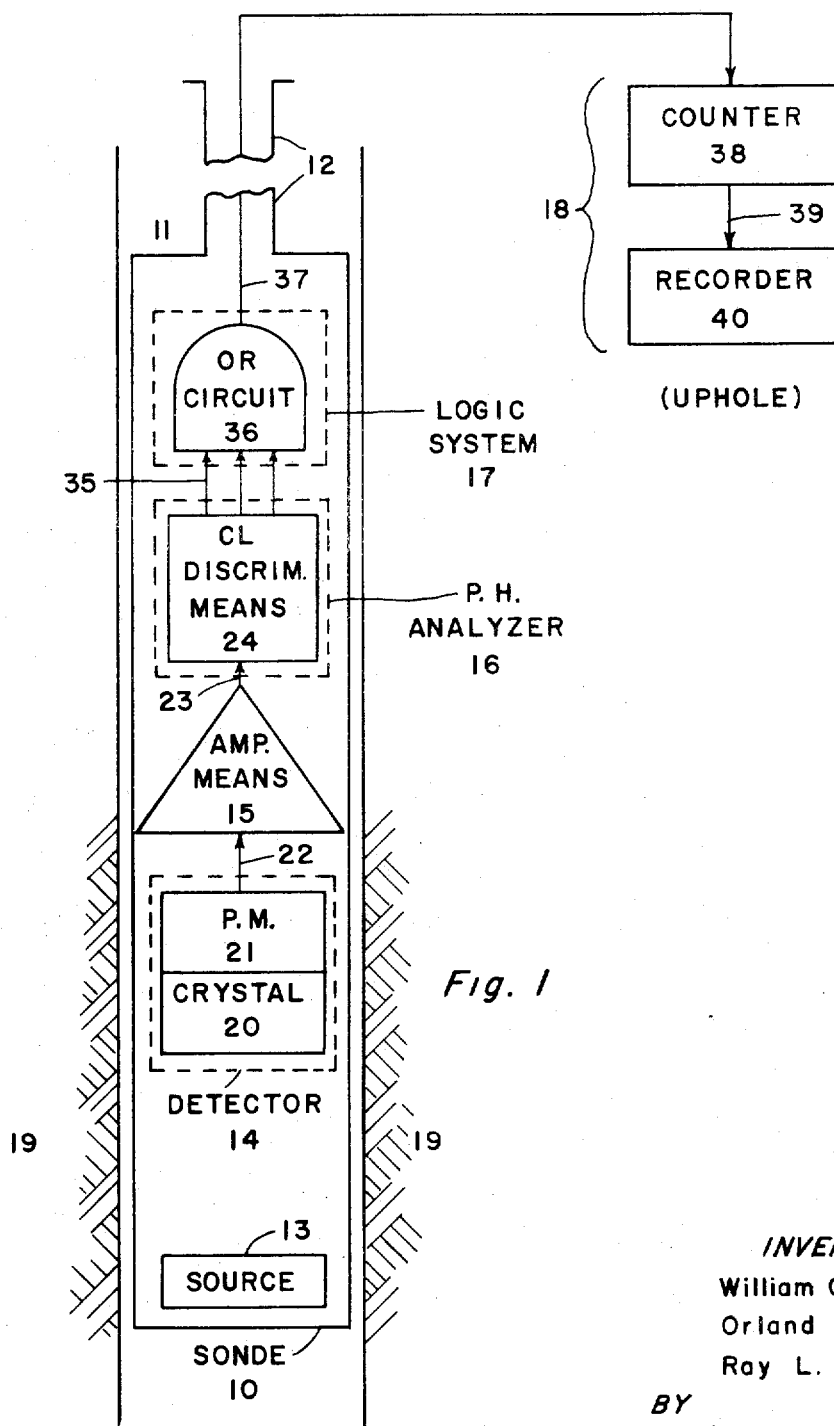
FIGURE 1 depicts a chlorine logging sonde including typical components and shows connection with uphole equipment.

FIGURE 1 shows chlorine logging tool or sonde 10 suspended in borehole 11 by cable or connector 12 which may be wound or unwound to raise or lower the sonde as desired. Sonde 10 includes neutron source 13, detector 14, amplying means 15, pulse height analyzer 16, and logic system 17. Uphole equipment 18 is electrically connected to the sonde through the supporting cable.

Neutron source 13 is located at the lower end of sonde 10 in a manner such that fast neutrons are directed into formation 19. Examples of suitable sources include plutonium-beryllium and americium-beryllium with a flux strength on the order of $2 \times 10^7$ neutrons/second.

Detector 14 is spaced apart from source 13 and includes scintillation crystal or phosphor 20 having photomultiplier tube 21 optically coupled thereto. The optimum source-crystal spacing will generally be somewhere between 18 and 22 inches depending on the particular source, its strength, the character of the surrounding formations, etc. The crystal is composed of a material such as cesium iodide (activated with thallium or sodium) or sodium iodide (activated with thallium) that produces scintillation, i.e., light flashes, proportional to the energy of the impinging prompt capture gamma rays. Photomultiplier tube 21 converts the scintillations into electrical pulse signals having amplitudes proportional to the energies of the detected gamma rays.

These pulse signals are passed to amplifying means 15 by line 22. The amplifying means generally is composed of one or more amplying stages and usually includes a variable gain amplifier.

The amplified pulse signals pass via line 23 to pulse height analyzer 16 which determines whether the signals fall within certain preselected energy ranges or windows. Included within analyzer 16 is chlorine discriminator means 24 which scans the energy spectrum over the interval of 5.00–6.50 mev. for signals characteristic of chlorine.

Figure 2:
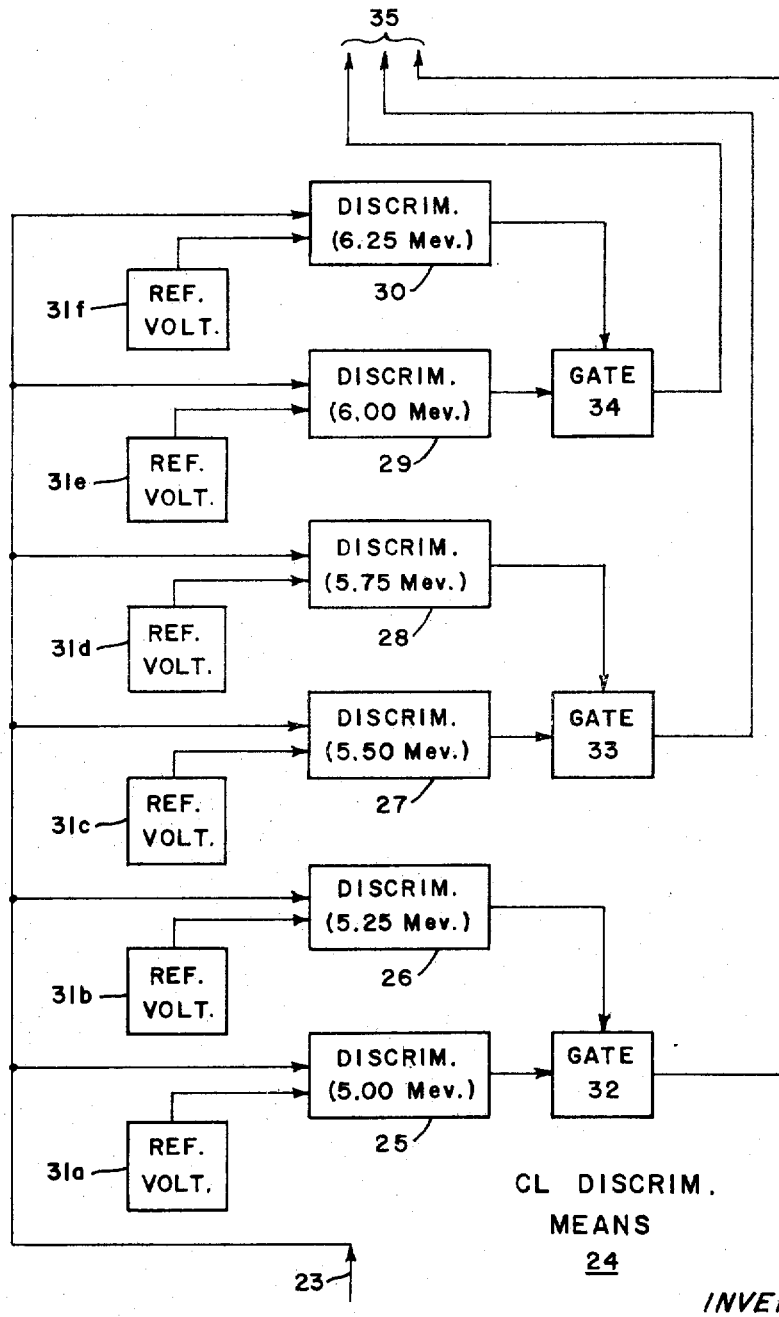
FIGURE 2 is a circuit diagram of the chlorine discriminator means which is embodied in the invention.

FIGURE 2 presents a circuit diagram of chlorine discriminator means 24 showing amplitude discriminators 25, 26, 27, 28, 29 and 30 connected in parallel to line 23. Each discriminator is biased with a reference voltage, viz., 31a, 31b, 31c, 31d, 31e, and 31f. Gates 32, 33, and 34 control the passage of pulses from discriminators 25, 27 and 29, respectively.

Each discriminator generates an output pulse if the input pulse thereto is equal to or greater than the amplitude of the energy level established by its particular reference voltage. The output pulses from discriminators 25, 27 and 29 pass through their associated gating circuits to output lines 35. The output pulses from discriminators 26, 28 and 30 trigger or close gates 32, 33, and 34, respectively.

Thus, the discriminators are arranged to operate or function in pairs so that each pair determines or fixes a predetermined energy range or window. Discriminators 25 and 26 define a window of 5.00–5.25 mev.; discriminators 27 and 28 establish a window of 5.50–5.75 mev.; and discriminators 29 and 30 establish a window of 6.00–6.25 mev. By taking these windows as characteristic of chlorine, one can readily and accurately determine the salinity of the formation being logged.

Referring again to FIGURE 1; lines 35 preferably pass to a downhole logic circuit, such as OR circuit 36, within logic system 17. OR circuit 36 produces an output pulse each time there is an input pulse on any of lines 35, thereby simplifying the telemetering system. Output pulses produced by OR circuit 36 travel by line 37 to uphole equipment 18 which includes counter 38 and recorder 40. Counter 38 totals the arriving pulses and passes the results on line 39 to recorder 40. Recorder 40 produces a visual or magnetic trace based on the data which is indicative of chlorine in the formation being logged.

It is understood that the invention is not limited to the specifically disclosed methods and apparatus but fully includes the subject matter as defined by the appended claims and all equivalents thereof.

We claim:
1. A method for chlorine logging in carbonate formations whereby response to chlorine is improved comprising
   (a) bombarding a preselected formation with fast neutrons,
   (b) detecting prompt capture gamma rays emitted in response to said neutrons,
   (c) analyzing the energy spectrum of said gamma rays to determine the pulse signals for windows having energy ranges of about 5.00–5.25 mev., 5.50–5.75 mev., and 6.00–6.25 mev., respectively, and
   (d) recording the total of the pulse signals determined for said windows as indicative of chlorine in said formation.
2. A method for chlorine logging according to claim 1 where step (c) is performed downhole.
3. A method for chlorine logging according to claim 2 where the pulse signals determined for said windows are totaled downhole.

References Cited

UNITED STATES PATENTS 3,114,835  12/1963  Packard _____ 250—71.5
3,244,882  4/1966  Baldwin et al. ____ 250—71.5 X ARCHIE R. BORCHELT, Primary Examiner U.S. Cl. X.R.

250—83.3